United States Patent
Hayashi et al.

(10) Patent No.: US 9,557,514 B2
(45) Date of Patent: Jan. 31, 2017

(54) LENS CAP

(71) Applicant: KONICA MINOLTA, INC., Tokyo (JP)

(72) Inventors: Naohiko Hayashi, Izumi (JP); Yoshifumi Mitani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/638,551

(22) Filed: Mar. 4, 2015

(65) Prior Publication Data

US 2015/0253531 A1    Sep. 10, 2015

(30) Foreign Application Priority Data

Mar. 10, 2014 (JP) .................................. 2014-046079

(51) Int. Cl.
*G02B 7/02* (2006.01)
*G03B 11/04* (2006.01)

(52) U.S. Cl.
CPC .............. *G02B 7/02* (2013.01); *G03B 11/041* (2013.01)

(58) Field of Classification Search
CPC ....... G02B 23/16; G02B 23/2476; G02B 7/02; G03B 11/041

USPC .......................................................... 359/511
See application file for complete search history.

(56) References Cited

U.S. PATENT DOCUMENTS

2009/0091827 A1*   4/2009   Gauger ................ G03B 11/041
                                                              359/511

FOREIGN PATENT DOCUMENTS

JP         2013-007772         1/2013

\* cited by examiner

*Primary Examiner* — Jennifer L. Doak
(74) *Attorney, Agent, or Firm* — Brinks Gilson & Lione

(57) ABSTRACT

A lens cap includes: a cap main frame; and a pair of operating members attached to a front surface of the cap main frame, wherein, when the operating members are made to slide outward by a biasing force, engaging portions at outer ends of the operating members are engaged with to-be-engaged portions in the front end opening, while first locking portions are formed at inner edges of the operating members, and second locking portions are formed on back surfaces of the operating members, concave portions are formed on the front surface of the cap main frame, first openings and second openings are formed in bottoms of the concave portions, cover plates are placed on the back surface of the cap main frame, and biasing members are placed between the cover plates and the back surface of the cap main frame.

3 Claims, 7 Drawing Sheets

LENS CAP

The entire disclosure of Japanese Patent Application No. 2014-046079 filed on Mar. 10, 2014 including description, claims, drawings, and abstract are incorporated herein by reference in its entirety.

BACKGROUND OF THE INVENTION

Field of the Invention

The present invention relates to a lens cap.

Description of the Related Art

There is a conventional lens cap that has a pair of operating members attached to the cap main frame covering the front end opening of a lens barrel in such a manner that the operating members can slide inward and outward with respect to the center of the cap main frame (see JP 2013-7772 A).

When the operating members are made to slide outward by a biasing force (pushing force), the engaging portions of the operating members are engaged with the to-be-engaged portions in the front end opening, so that the cap main frame is attached to the front end opening of the lens barrel.

Also, when the outer edge portions of the operating members protruding outward from the outer peripheral surface of the cap main frame are made to slide inward with fingers, the engaging portions of the operating members are disengaged from the to-be-engaged portions in the front end opening, so that the cap main frame can be detached from the front end opening of the lens barrel.

However, the outer edge portions of the operating members protrude outward from the outer peripheral surface of the cap main frame. Therefore, if a hand or the like comes into contact with the protruding outer edge portions of the operating members by mistake while the cap main frame is attached to the front end opening of the lens barrel, the operating members are made to slide inward, and the cap main frame might inadvertently fall off.

SUMMARY OF THE INVENTION

The present invention has been made to solve the above problem, and an object thereof is to provide a lens cap that can prevent the cap main frame from inadvertently falling off, as the operating members are prevented from coming into contact with a hand or the like by mistake.

To achieve the abovementioned object, according to an aspect, a lens cap reflecting one aspect of the present invention comprises a cap main frame that covers the front end opening of a lens barrel, and a pair of operating members that are attached to the front surface of the cap main frame in such a manner that the operating members can slide inward and outward with respect to the center of the cap main frame. When the operating members are made to slide outward by a biasing force in this lens cap, engaging portions at the outer edges of the operating members are engaged with to-be-engaged portions in the front end opening, so that the cap main frame is attached to the front end opening of the lens barrel. First locking portions are formed at the inner edges of the operating members, and second locking portions are formed on the back surfaces of the operating members. On the front surface of the cap main frame, concave portions are formed. The concave portions surround the outer peripheral surfaces of operating members so that the outer peripheral surfaces of the operating members do not protrude outward from the outer peripheral surface of the cap main frame, and stop movement of the back surfaces of the operating members. The bottoms of the concave portions have first openings through which the engaging portions of the operating members are engaged with the side of the back surface from the front surface, and second openings through which the first locking portions of the operating members are engaged with the side of the back surface from the front surface. Cover plates are placed on the side of the back surface of the cap main frame. The cover plates have first to-be-locked portions to be locked with the first locking portions of the operating members and second to-be-locked portions to be locked with the second locking portions of the operating members. Biasing members (Pushing members) are placed between the cover plates and the back surface of the cap main frame. When the cover plates are pushed outward by the biasing members, the operating members are made to slide outward.

According to an aspect of the present invention, the outer peripheral surfaces of the operating members engaged with the concave portions on the front surface of the cap main frame are surrounded by the inner peripheral surfaces of the concave portions so that the outer peripheral surfaces of the operating members do not protrude outward from the outer peripheral surface of the cap main frame. Accordingly, the operating members surrounded by the concave portions do not come into contact with a hand or the like by mistake. Thus, the cap main frame can be prevented from inadvertently falling off.

As the engaging portions of the operating members and the first locking portions of the operating members are engaged with the back surfaces of the bottoms of the concave portions through the first openings and the second openings, respectively, the back surfaces of the operating members are stopped by the bottoms of the concave portions, and are restricted from moving toward the back side. Also, on the back surface of the cap main frame, the first to-be-locked portions of the cover plates are locked with the first locking portions of the operating members, and the second to-be-locked portions of the cover plates are locked with the second locking portions of the operating members, so that the cap main frame is restricted from moving toward the front side. Accordingly, the operating members are prevented from moving forward and coming off the concave portions.

Furthermore, as the biasing members placed between the cover plates and the back surface of the cap main frame pushes the cover plates outward, the operating members are made to slide outward. Accordingly, with the cover plates, the operating members can be prevented from falling off on the front side.

The cover plates preferably have covering portions that cover the exteriors of the biasing members.

In this structure, the exteriors of the biasing members (coil springs, for example) are completely covered with the covering portions of the cover plates. Accordingly, the appearance is improved, and users do not inadvertently touch the biasing members.

The first locking portions of the operating members are preferably hooks extending inward, and the first to-be-locked portions of the cover plates are preferably hook holes to be locked with the hooks. The second locking portions of the operating members are preferably protrusions extending backward, and the second to-be-locked portions of the cover plates are preferably insertion holes into which the protrusions are to be inserted.

In this structure, the hook holes of the cover plates are locked with the hooks of the operating members, and the protrusions of the operating members are inserted into the insertion holes of the cover plates, so that the operating members and the cover plates can be attached to the cap main frame in one action. The cover plates cannot be separated from the operating members, unless the insertion holes are disengaged from the protrusions of the operating members and the hook holes are removed from the hooks of the operating members, in spite of the biasing force of the biasing members. Accordingly, even if a user inadvertently touches the cover plates, the cover plates will not come off.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1A:
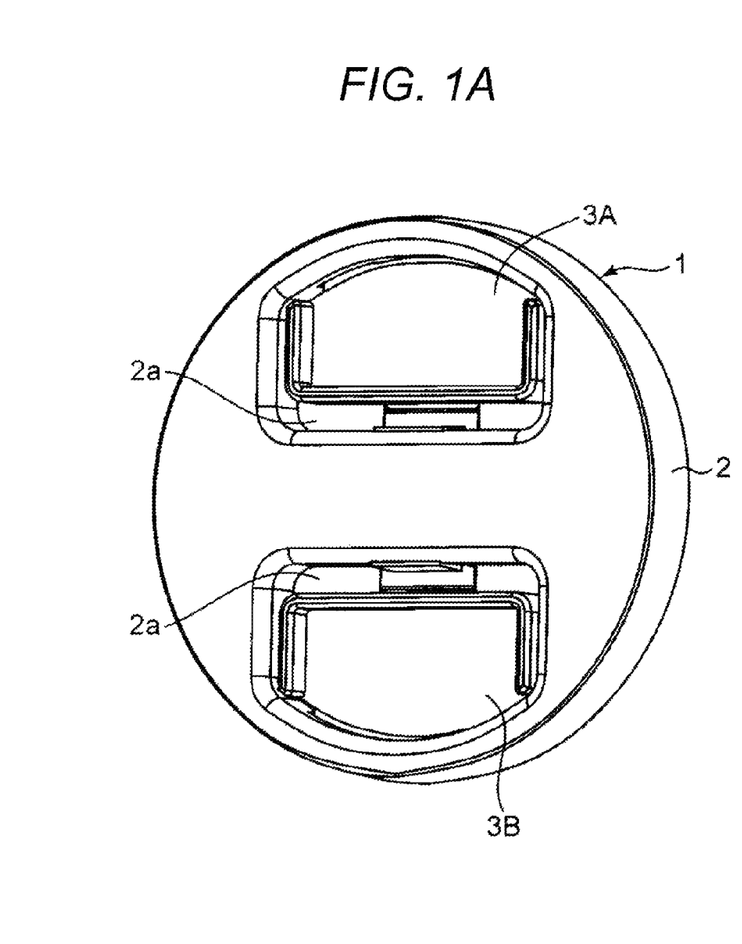
FIG. 1A is a perspective view of the front surface of a lens cap according to an embodiment of the present invention.
Figure 1B:
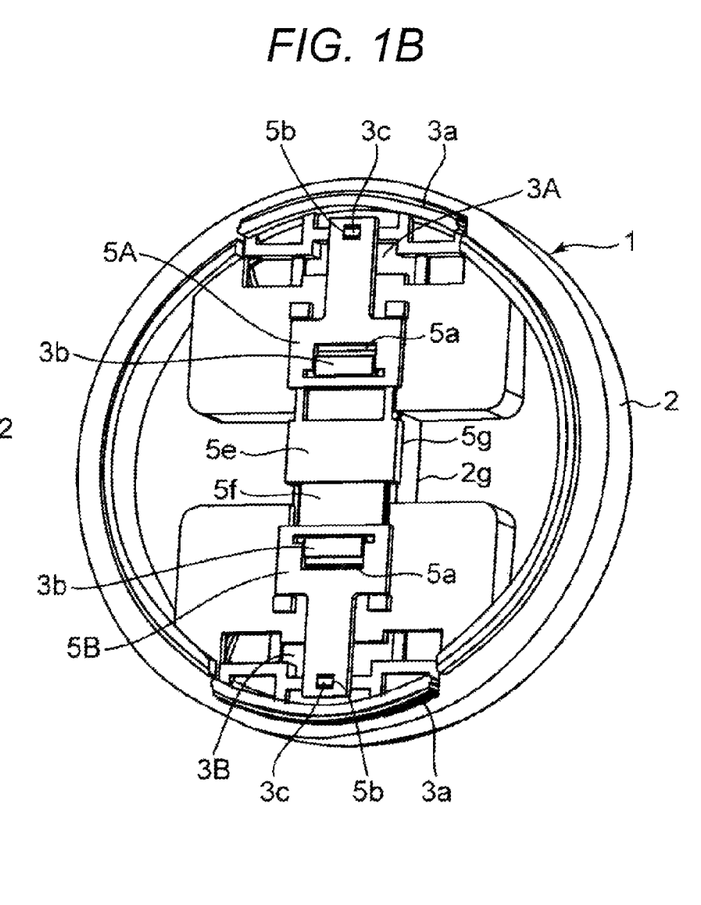
FIG. 1B is a perspective view of the back surface of the lens cap.
Figure 2A:
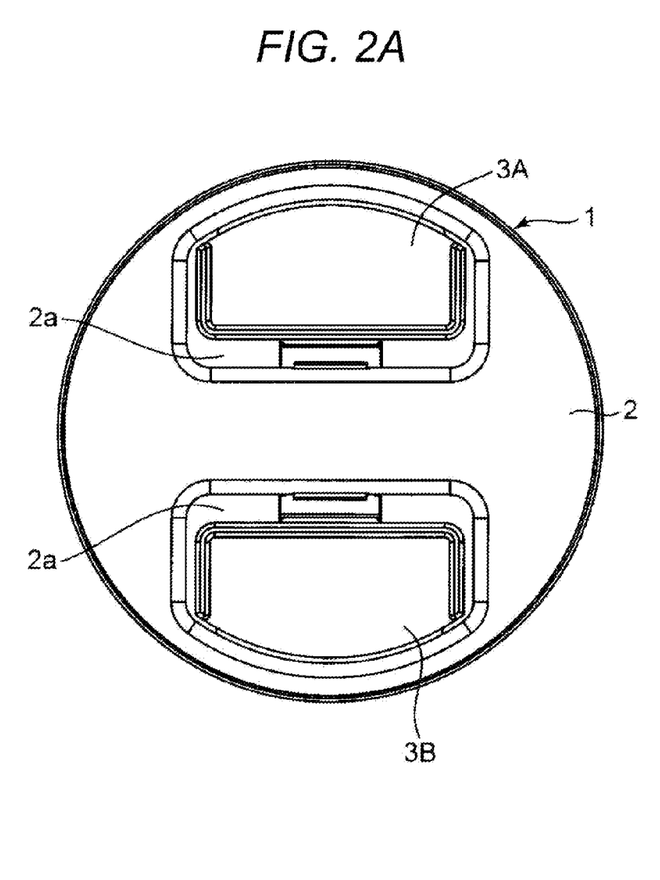
FIG. 2A is a front view of the lens cap of FIG. 1 at a time when the operating members slide outward.
Figure 2B:
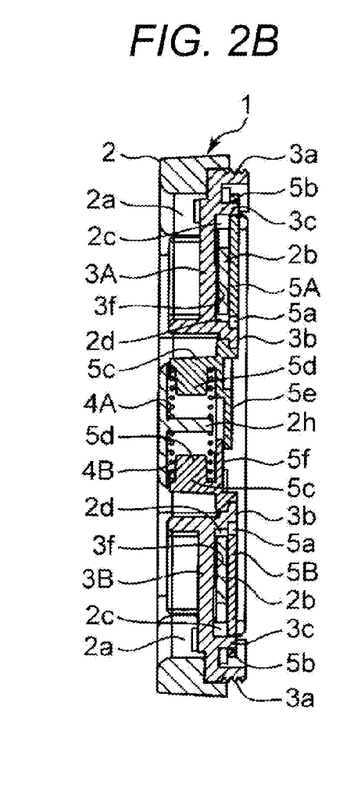
FIG. 2B is a cross-sectional view of the lens cap shown in FIG. 2A.
Figure 3A:
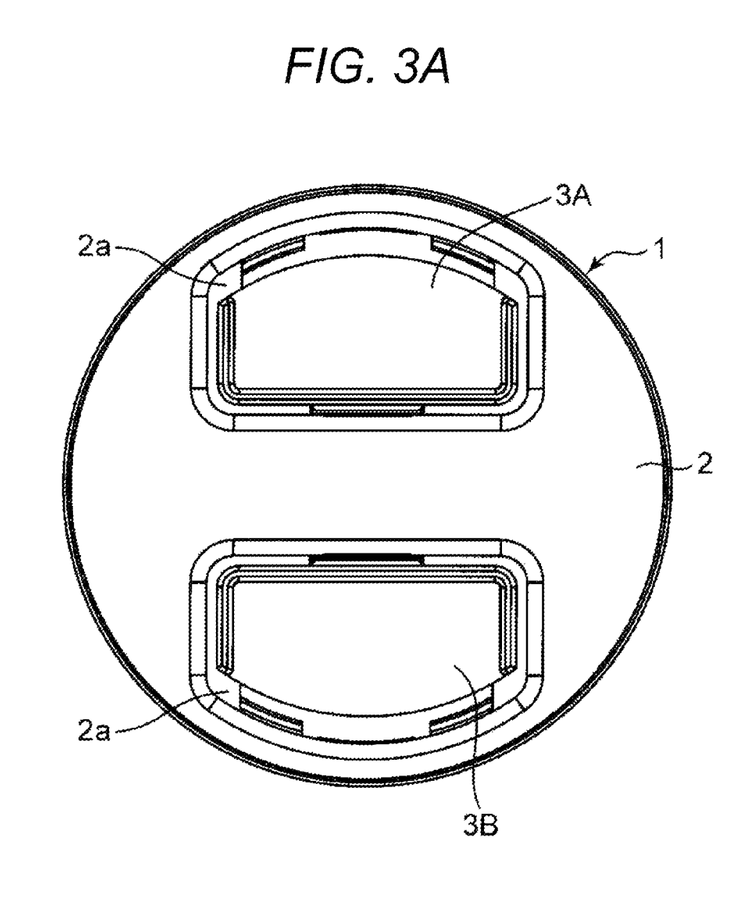
FIG. 3A is a front view of the lens cap of FIG. 1 at a time when the operating members slide inward.
Figure 3B:
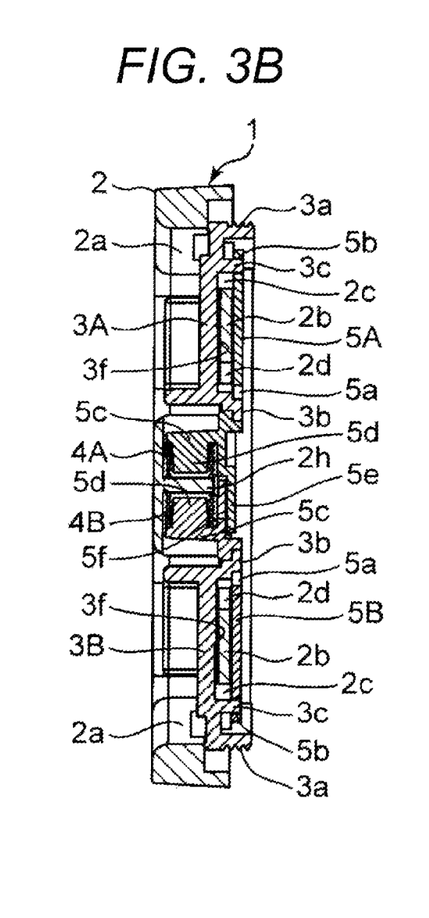
FIG. 3B is a cross-sectional view of the lens cap shown in FIG. 3A.

Hereinafter, an embodiment of the present invention will be described in detail with reference to the drawings. However, the scope of the invention is not limited to the illustrated examples. FIGS. 1A and 1B show a lens cap 1. FIG. 1A is a perspective view of the front surface of the lens cap 1, and FIG. 1B is a perspective view of the back surface of the lens cap 1. FIGS. 2A and 2B also show the lens cap 1. FIG. 2A is a front view of the lens cap 1 at a time when operating members 3A and 3B slide outward, and FIG. 2B is a cross-sectional view of the lens cap 1 shown in FIG. 2A. FIGS. 3A and 3B also show the lens cap 1. FIG. 3A is a front view of the lens cap 1 at a time when the operating members 3A and 3B slide inward, and FIG. 3B is a cross-sectional view of the lens cap 1 shown in FIG. 3A.

The lens cap 1 includes a cap main frame 2, a pair of operating members 3A and 3B, a pair of coil springs (biasing members) 4A and 4B, and a pair of cover plates 5A and 5B.

The cap main frame 2, the operating members 3A and 3B, and the cover plates 5A and 5B are made of a synthetic resin (PC/ABS or the like), for example, and the coil springs 4A and 4B are made of a metal, for example. However, the materials are not limited to the above.

Figure 4A:
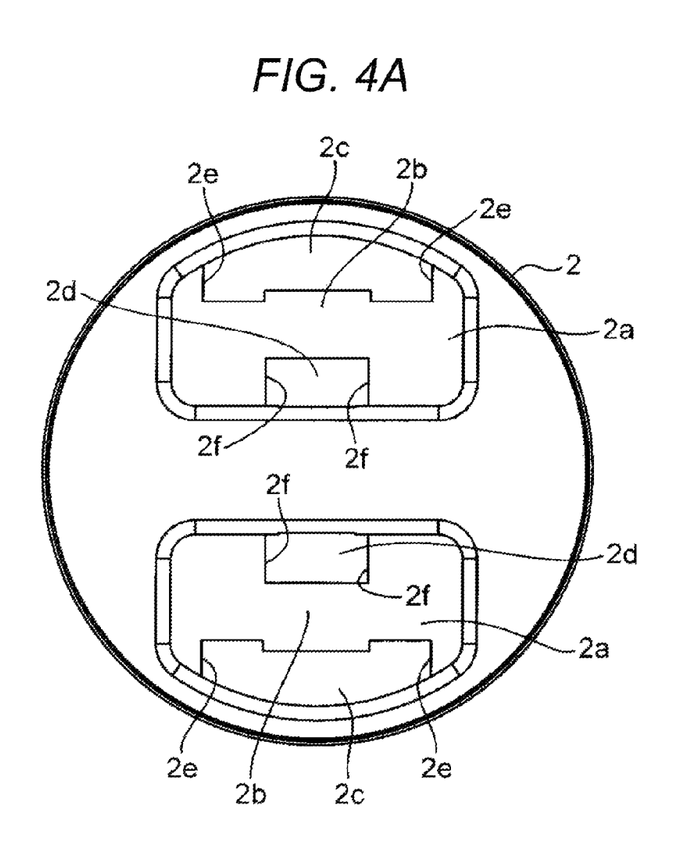
FIG. 4A is a front view of the cap main frame.
Figure 4B:
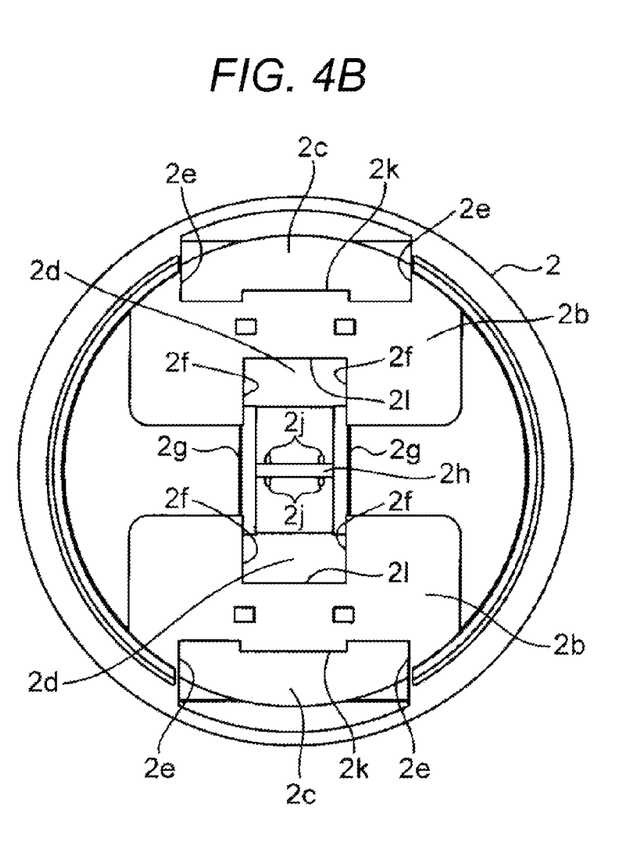
FIG. 4B is a back view of the cap main frame.
Figure 5A:
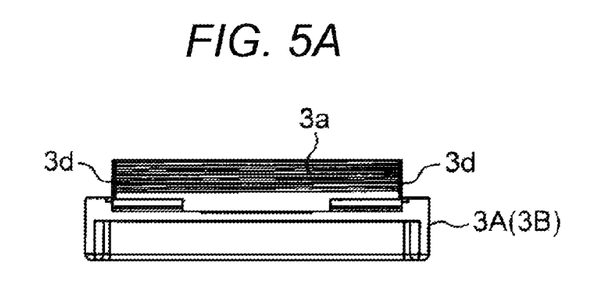
FIG. 5A is a plan view of an operating member.
Figure 5B:
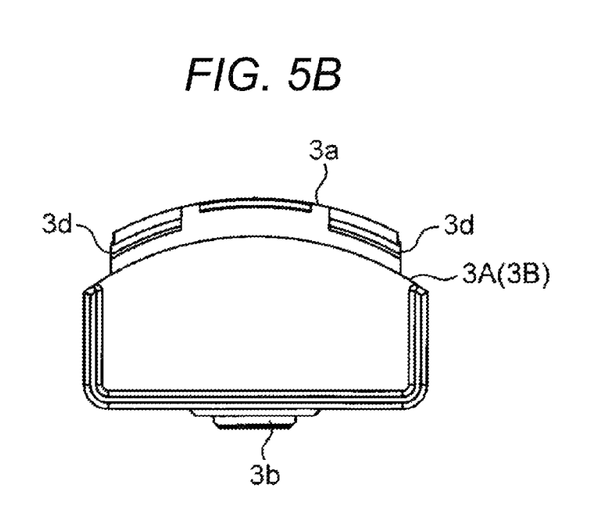
FIG. 5B is a front view of the operating member.
Figure 5C:
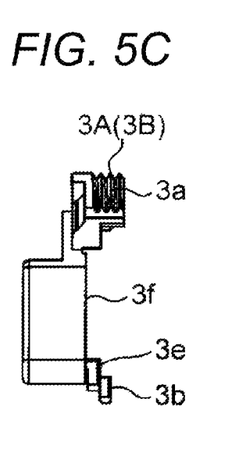
FIG. 5C is a side view of the operating member.
Figure 5D:
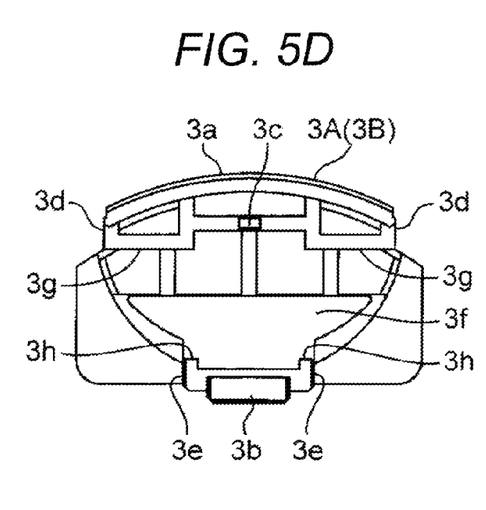
FIG. 5D is a back view of the operating member.

As shown in FIG. 4, the cap main frame 2 is designed to have a circular outline to cover the front end opening of a lens barrel. On the front surface of the cap main frame 2, concave portions 2a that surround the outer peripheral surfaces of the operating members 3A and 3B so as to prevent the outer peripheral surfaces of the operating members 3A and 3B from protruding outward from the outer peripheral surface of the cap main frame 2 are formed at locations that are symmetrical about the optical axis center.

As shown in FIGS. 5A to 5D, an arcuate engaging portion (a male screw) 3a that can be engaged with a to-be-engaged portion (a female screw, not shown) in the front end opening of the lens barrel is formed at the outer edge of each of the operating members 3A and 3B. As the engaging portions 3a are engaged with the to-be-engaged portions in the front end opening, the cap main frame 2 is detachably attached to the front end opening of the lens barrel.

A first locking portion 3b that is a hook-like portion extending inward is formed at the inner edge of each of the operating members 3A and 3B, and a second locking portion 3c that protrudes backward is formed in front of the engaging portion 3a on the back surface of each of the operating members 3A and 3B.

Further, guide faces 3d that are parallel to each other are formed at both sides of each engaging portion 3a, and guide faces 3e that are parallel to each other are formed at both sides of each first locking portion 3b.

Meanwhile, the respective concave portions 2a of the cap main frame 2 have bottoms 2b that stop the back surfaces 3f of the operating members 3A and 3B. The bottoms 2b have first openings 2c through which the engaging portions 3a of the operating members 3A and 3B are engaged with the side of the back surface from the side the front surface, and second openings 2d through which the first locking portions 3b of the operating members 3A and 3B are engaged with the side of the back surface from the side of the front surface.

In each of the operating members 3A and 3B, the guide faces 3d at both sides of the engaging portion 3a are guided by guide faces 2e at both sides of the first opening 2c, and the guide faces 3e at both sides of the first locking portion 3b are guided by guide faces 2f of the second opening 2d. Accordingly, the operating members 3A and 3B are guided to slide inward and outward with respect to the center of the cap main frame 2.

On the back surface of the cap main frame 2, a pair of vertical ribs 2g are formed at locations on slightly inner sides of the guide faces 2f of the second openings 2d, and a horizontal rib 2h is formed in the intermediate position in the longitudinal direction of the vertical ribs 2g (or at the center of the cap main frame 2). On both surfaces of the horizontal rib 2h, protrusions 2j for stopping movement of the coil springs 4A and 4B are formed.

Upper convex portions 2k of the cap main frame 2 serve as inner stoppers when lower convex portions 3g come into contact with the upper convex portions 2k while the operating members 3A and 3B are sliding inward, and upper concave portions 2l of the cap main frame 2 serve as outer stoppers when lower convex portions 3h come into contact with the upper concave portions 2l while the operating members 3A and 3B are sliding outward.

As shown in FIGS. 6A to 7D, in the pair of cover plates 5A and 5B placed on the side of the back surface of the cap main frame 2, first to-be-locked portions 5a that are hook holes to be locked with the hook-like first locking portions 3b of the operating members 3A and 3B are formed. Second to-be-locked portions 5b that are insertion holes to be locked with the protruding second locking portions 3c of the operating members 3A and 3B are also formed.

Further, protruding table portions 5c to be inserted between the vertical ribs 2g of the cap main frame 2 are formed on the cover plates 5A and 5B, and protrusions 5d for stopping movement of the coil springs 4A and 4B are formed on the respective protruding table portions 5c.

The coil springs 4A and 4B have outer edge portions engaged with the outer sides of the stopper protrusions 5d of the protruding table portions 5c of the cover plates 5A and 5B, and inner edge portions held between the stopper protrusions 2j of the horizontal rib 2h.

Alternatively, the horizontal rib 2h may be removed, and the outer edge portion of one coil spring may be engaged with the respective stopper protrusions 5d of the protruding table portions 5c of the cover plates 5A and 5B. Instead of the coil springs 4A and 4B, biasing members made of elastic rubber or the like may be used.

When the cover plates 5A and 5B are pushed outward by the coil springs 4A and 4B, respectively, the operating members 3A and 3B are pushed via the first to-be-locked portions 5a and the first locking portions 3b, and slide outward.

Figure 6A:
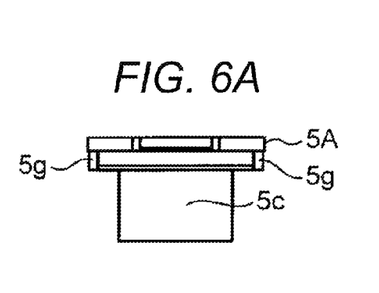
FIG. 6A is a plan view of one of the cover plates.
Figure 6B:
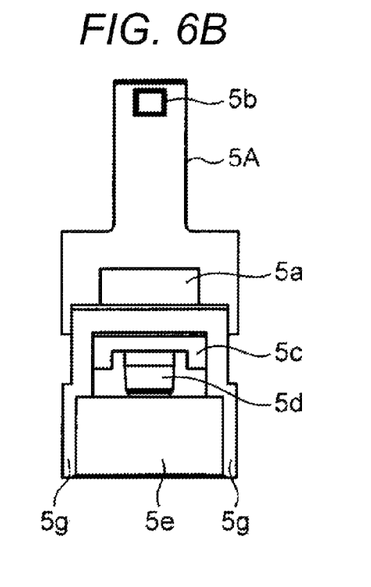
FIG. 6B is a front view of the cover plate.
Figure 6C:
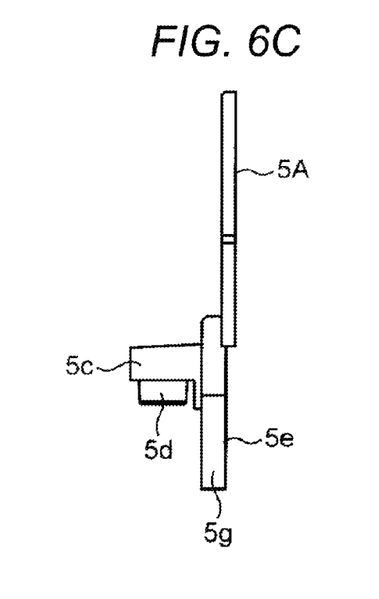
FIG. 6C is a side view of the cover plate.
Figure 6D:
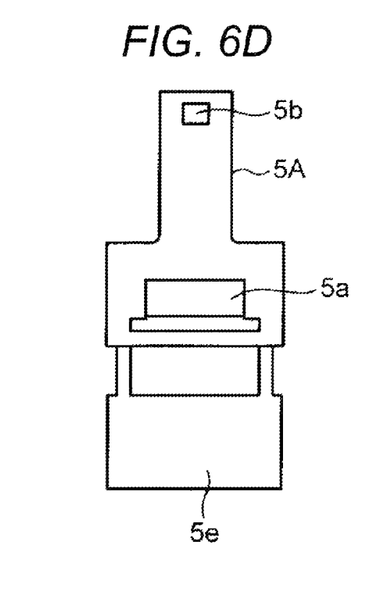
FIG. 6D is a back view of the cover plate.
Figure 7A:
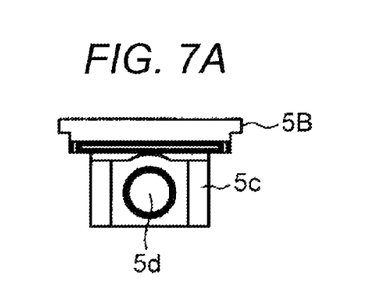
FIG. 7A is a plan view of the other cover plate.
Figure 7B:
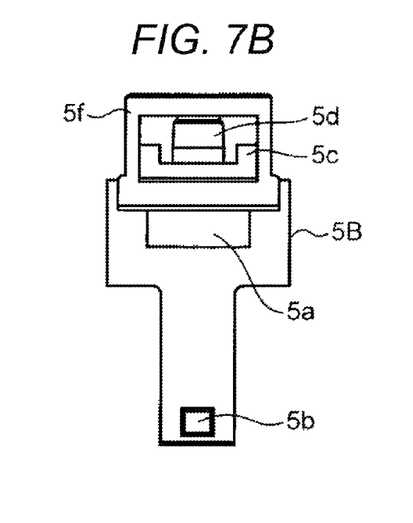
FIG. 7B is a front view of the other cover plate.
Figure 7C:
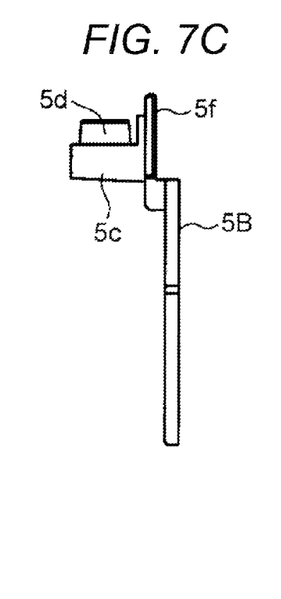
FIG. 7C is a side view of the other cover plate.
Figure 7D:
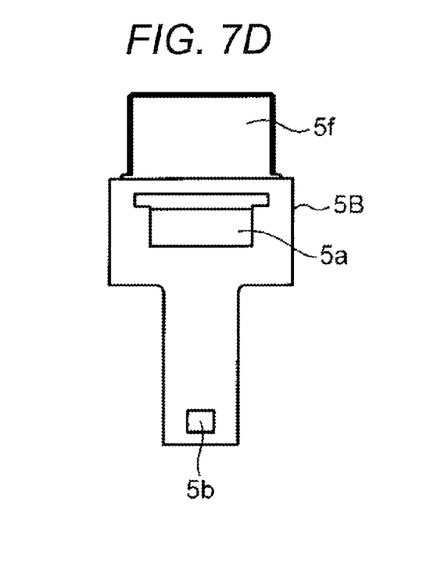
FIG. 7D is a back view of the other cover plate.

The inner edge portions 5e and 5f of the cover plates 5A and 5B extend inward. The inner edge portion 5e of the cover plate 5A is designed to have such a length as to overlap with a back portion of the inner edge portion 5f of the cover plate 5B, and side rim portions 5g protruding forward are formed as both rims of the inner edge portion 5e of the cover plate 5A. The inner edge portions 5e and 5f of the cover plates 5A and 5B, the side rim portions 5g, and the vertical ribs 2g of the cap main frame 2 function as covering portions that cover the coil springs 4A and 4B.

As the lens cap 1 has the above described structure, the outer peripheral surfaces of the operating members 3A and 3B engaged with the concave portions 2a on the front surface of the cap main frame 2 are surrounded by the inner peripheral surfaces of the concave portions 2a so that the outer peripheral surfaces of the operating members 3A and 3B do not protrude outward from the outer peripheral surface of the cap main frame 2. Accordingly, the operating members 3A and 3B surrounded by the concave portions 2a do not come into contact with a hand or the like by mistake. Thus, the cap main frame 2 can be prevented from inadvertently falling off.

The engaging portions 3a of the operating members 3A and 3B are engaged with the back surfaces of the bottoms 2b of the concave portions 2a through the first openings 2c, and the first locking portions 3b of the operating members 3A and 3B are engaged with the back surfaces of the bottoms 2b of the concave portions 2a through the second openings 2d. Accordingly, the back surfaces 3f of the operating members 3A and 3B are stopped by the bottoms 2b of the concave portions 2a, and are restricted from moving backward.

On the back surface of the cap main frame 2, the hook-hole-like first to-be-locked portions 5a of the cover plates 5A and 5B are locked with the hook-like first locking portions 3b of the operating members 3A and 3B. Also, the insertion-hole-like second to-be-locked portions 5b of the cover plates 5A and 5B are locked with the protruding second locking portions 3c of the operating members 3A and 3B. With this, the cap main frame 2 is restricted from moving forward. As a result, the operating members 3A and 3B are prevented from moving forward and coming off the concave portions 2a. The first locking portions 3b and the first to-be-locked portions 5a are not necessarily hooks and hook holes, and the second locking portions 3c and the second to-be-locked portions 5b are not necessarily protrusions and insertion holes.

Furthermore, as the coil springs 4A and 4B placed between the cover plates 5A and 5B and the back surface of the cap main frame 2 push the cover plates 5A and 5B outward, the operating members 3A and 3B are made to slide outward. Accordingly, the cover plates 5A and 5B can prevent the operating members 3A and 3B from falling off on the front side.

As the cover plates 5A and 5B have the inner edge portions 5e and 5f and the side rim portions 5g that function as covering portions that cover the coil springs 4A and 4B, the coil springs 4A and 4B are completely covered with the covering portions. With this, the appearance is improved, and users can be prevented from inadvertently touching the coil springs 4A and 4B.

Furthermore, the hook-hole-like first to-be-locked portions 5a of the cover plates 5A and 5B are locked with the hook-like first locking portions 3b of the operating members 3A and 3B. The insertion-hole-like second to-be-locked portions 5b of the cover plates 5A and 5B are then engaged with the protruding second locking portions 3c of the operating members 3A and 3B, so that the operating members 3A and 3B and the cover plates 5A and 5B can be attached to the cap main frame 2 in one action.

The cover plates 5A and 5B cannot be separated from the operating members 3A and 3B, unless the insertion-hole-like second to-be-locked portions 5b are disengaged from the protruding second locking portions 3c of the operating members 3A and 3B, and the hook-hole-like first to-be-locked portions 5a are removed from the hook-like first locking portions 3b of the operating members 3A and 3B, in spite of the biasing force of the coil springs 4A and 4B. Accordingly, even if a user inadvertently touches the cover plates 5A and 5B, the cover plates 5A and 5B will not come off.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A lens cap comprising:
   a cap main frame configured to cover a front end opening of a lens barrel; and
   a pair of operating members attached on a front surface of the cap main frame that faces away from the front end opening, wherein attachment of the pair of operating members on the front surface of the cap main frame allows the pair of operating members to slide inward and outward with respect to a center of the cap main frame,
   wherein,
   when the pair of operating members are made to slide outward by a biasing force, engaging portions at outer ends of the pair of operating members are engaged with to-be-engaged portions in the front end opening, and the cap main frame is attached to the front end opening of the lens barrel,
   first locking portions are formed at inner edges of the pair of operating members, and second locking portions are formed on back surfaces of the pair of operating members,
   concave portions are formed on the front surface of the cap main frame, the concave portions surrounding outer peripheral surfaces of the pair of operating members so as to prevent the pair of operating members from protruding outward from an outer peripheral surface of the cap main frame, first openings and second openings are formed in bottoms of the concave portions, the engaging portions and the second locking portions of the pair of operating members protruding from the front surface of the of the cap main frame to a back surface of the cap main frame through the first openings, the first locking portions of the pair of operating members from the front surface of the cap main frame to the back surface of the cap main frame through the second openings, cover plates are placed on the back surface of the cap main frame, the cover plates having first to-be-locked portions and second to-be-locked portions, the first to-be-locked portions of the cover plates being locked with the first locking portions of the pair of operating members, the second to-be-locked portions of the cover plates being locked with the second locking portions of the pair of operating members, and biasing members are placed between the cover plates and the back surface of the cap main frame, the pair of operating members being made to slide outward when the cover plates are pushed outward by the biasing members.

2. The lens cap according to claim 1, wherein the cover plates include covering portions configured to cover exteriors of the biasing members.

3. The lens cap according to claim 1, wherein the first locking portions of the pair of operating members are hooks extending inward, while the first to-be-locked portions of the cover plates are hook holes to be locked with the hooks, and the second locking portions of the pair of operating members are protrusions extending backward, while the second to-be-locked portions of the cover plates are insertion holes into which the protrusions are inserted.

\* \* \* \* \*